US011625796B1

(12) United States Patent
Xia et al.

(10) Patent No.: US 11,625,796 B1
(45) Date of Patent: Apr. 11, 2023

(54) INTELLIGENT PREDICTION OF AN EXPECTED VALUE OF USER CONVERSION

(71) Applicant: Airbnb, Inc., San Francisco, CA (US)

(72) Inventors: Xingnan Xia, San Francisco, CA (US); Shawn Chen, Milbrae, CA (US); Shike Mei, San Carlos, CA (US)

(73) Assignee: AIRBNB, INC., San Francisco, CA (US)

( * ) Notice: Subject to any disclaimer, the term of this patent is extended or adjusted under 35 U.S.C. 154(b) by 0 days.

(21) Appl. No.: 16/653,722

(22) Filed: Oct. 15, 2019

(51) Int. Cl.
  *G06Q 30/02* (2012.01)
  *G06Q 50/16* (2012.01)
  *G06N 20/00* (2019.01)
  *G06F 16/28* (2019.01)
  *G06Q 30/0202* (2023.01)

(52) U.S. Cl.
  CPC .......... *G06Q 50/16* (2013.01); *G06F 16/285* (2019.01); *G06N 20/00* (2019.01); *G06Q 30/0202* (2013.01)

(58) Field of Classification Search
  CPC .............. G06Q 50/16; G06Q 30/0202; G06Q 30/0207; G06Q 30/0201; G06Q 30/0247; G06N 20/00; G06F 16/285
  USPC ...................................................... 705/14.46
  See application file for complete search history.

(56) References Cited

U.S. PATENT DOCUMENTS

| | | | | |
|---|---|---|---|---|
| 2006/0122879 A1* | 6/2006 | O'Kelley | ........... | G06Q 30/0254 705/14.46 |
| 2009/0234710 A1* | 9/2009 | Belgaied Hassine | ........................ | G06Q 30/0201 705/7.29 |
| 2011/0196690 A1* | 8/2011 | Peles | ...................... | G06Q 30/02 707/E17.014 |
| 2016/0012135 A1* | 1/2016 | Wang | ................. | G11C 14/0018 707/731 |
| 2020/0160373 A1* | 5/2020 | Thimmaiah | ........ | G06Q 30/0244 |
| 2020/0202394 A1* | 6/2020 | Putrevu | .............. | G06Q 30/0277 |

FOREIGN PATENT DOCUMENTS

WO  WO 2017/127804 A1 *  1/2017  ............. G06Q 10/00

OTHER PUBLICATIONS

"Designing for ROI: Toward a Value-Driven Discipline for E-commerce Systems Design" Jungpil Hahn et al 2002.*

* cited by examiner

*Primary Examiner* — Victoria E. Frunzi
(74) *Attorney, Agent, or Firm* — Morgan, Lewis & Bockius LLP

(57) ABSTRACT

Highly user-specific data is used to calculate user intent to make a purchase and the value of such a purchase. User activity and information is aggregated, per user, for a set window of time and real-time data on recent site behavior is obtained. Aggregated and/or real-time data is considered by a predictive intent model (calculating the probability that the user will make a purchase) and a predictive value model (calculating the expected revenue such a purchase may generate). Weights, specific to each model, are assigned to predictor features tracked in the aggregated and/or real-time user data. The most highly-weighted features of the intent model relate to users' viewing history, and the most highly-weighted features of the value model relate to price and market. By these means, a user conversion value can be obtained, guiding the application of user acquisition strategies for different home sharing markets.

16 Claims, 6 Drawing Sheets

INTELLIGENT PREDICTION OF AN EXPECTED VALUE OF USER CONVERSION

RELATED ART

Web-based search services, social media, and other user-facing content distributors and marketing channels may obtain revenue by displaying to a user, alongside content such as relevant search results, advertisements or other marketing media relevant to a user and/or their searched-for keywords. Such search services may charge an advertiser per impression (view) or per click-through (follow to advertiser's site) of an advertisement, a flat per-bid price, or other type of charge for displaying the advertiser's advertisement to users. Due to the costs of advertisement (whether monetary or resource cost), advertisers must make decisions about which advertisements and/or marketing targets to pursue.

Traditionally, advertisers manage their marketing target audience, budgets, and user acquisition strategies though an intent-based system where advertisers make guesses or inferences as to user intent in order to select, among other things, the best channels and target groups to whom to send their advertisements. Such guesses are generally based solely on the advertiser's intuition and market knowledge, requiring human intervention and intelligence.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

Figure 1:
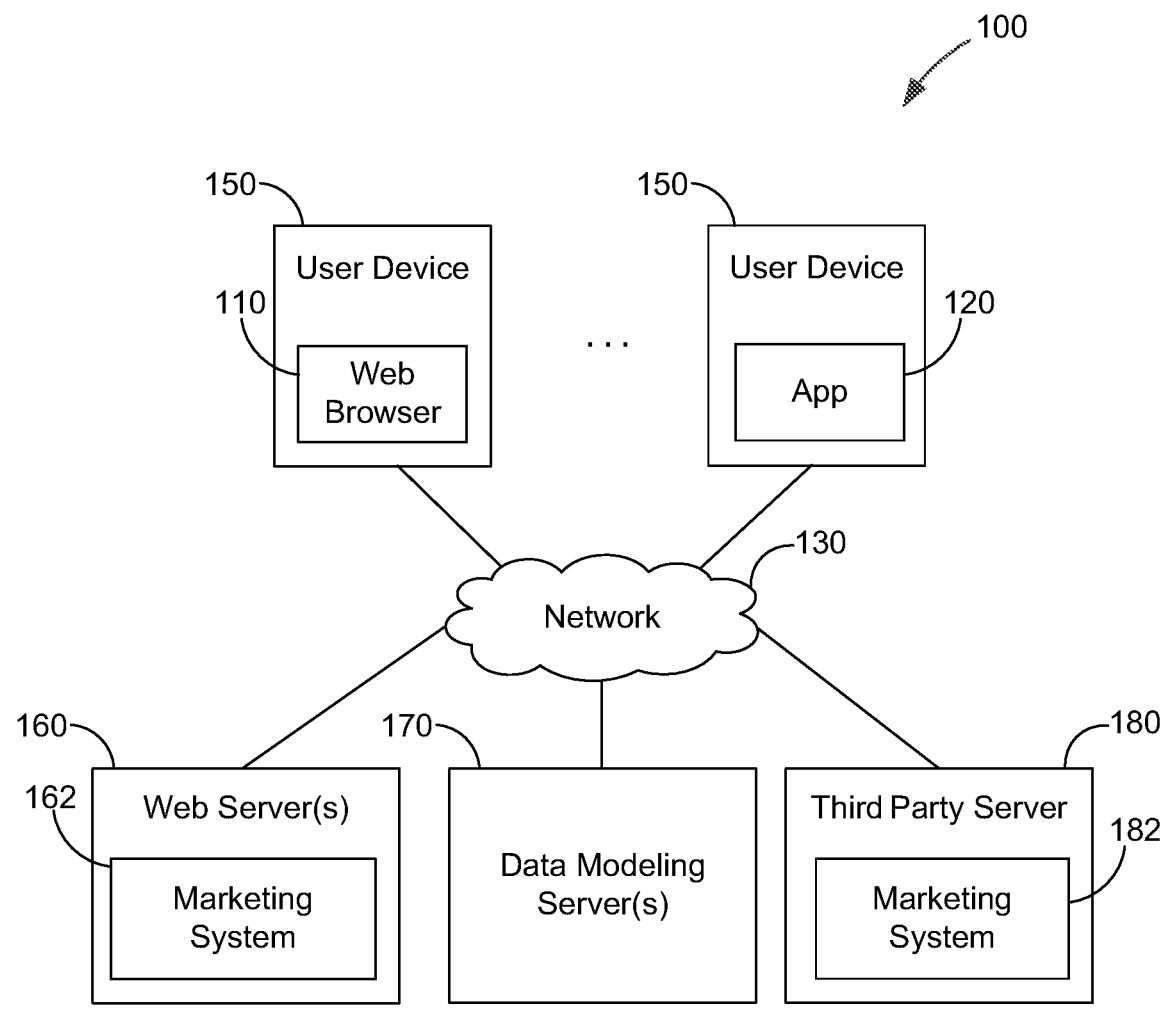
FIG. 1 is a diagram of an environment configured to determine intent and value-based marketing return in accordance with some embodiments of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

Embodiments of the present disclosure generally pertain to systems and methods for applying machine learning methods to predict in real time each site visitor's (user) likelihood for conversion (making a purchase) and potential value or revenue of that conversion, within a predefined conversion window. The quantitative results can be used to calculate a return on investment (ROI) for a marketing activity or campaign to that user, and can be used in optimizing various user acquisition channels. A user acquisition channel may include any program or method to acquire new or repeat customers, such as displaying ads (e.g., on Facebook, Youtube or other social media platforms), Google Display Network, Google Keywords, promotional emails/push notifications, referrals, landing pages, and the like.

A system in accordance with an exemplary embodiment of the present disclosure includes an intent model to predict a user's likelihood to purchase and a value model to predict the value of that purchase. The intent model and the value model are positioned to access website server logs, other raw data sources, and aggregated data sources storing information about the user, their activity, and the like, which are used to continually train and update the models. The trained models can be fed aggregated and real-time data to reach the above-mentioned predictions.

In one embodiment, the intent model may use logistic regression to assign weights to predictor features tracked in the aggregated and/or real-time user data. The most important (and therefore most highly weighted) features for the intent model are those related to the frequency of a user's actions on a website, such as a user's account history, same-day site behavior, past bookings/visits, frequencies of views, etc. In one embodiment, the value model may use linear regression, assigning different (or potentially different) weights to the same set of features as the intent model. The most important (and therefore most highly weighted) features for the value model are those related to destination city, median price, or other price-based features. The value model optimizes such that an absolute difference between the predicted value of booking and the actual value of booking is as small as possible, determining weights for the features to minimize this difference. The result of either model may be variously optimized to meet certain metrics. For instance, marketing efforts may seek to optimize a target number of bookings or a return on investment (ROI) for a marketing campaign. By use of the intent model and value model, an objective user conversion value can be obtained, guiding the application of user acquisition strategies for different markets, including, e.g., home sharing markets.

One type of exemplary system is an online reservation system that displays to users listings of properties, such as houses, condominiums, rooms, apartments, lots, and other real estate, that an owner/manager (referred to hereinafter as a "host") may offer to the user (referred to hereinafter as a "guest") for reservation (sometimes referred to as a "booking" or "rental") for a specified time period (e.g., a day, week, month, or other period of interest). The online reservation system displays these reservable properties to guests as property "listings," which contain information such as price ranges, dates, number of bedrooms, and/or other factors that may be of interest to guests in making a reservation. In one embodiment, when a guest books a property, the online reservation system may allow for intake, from the host, of a booking fee, an initial setup fee, a recurring fee, no fee, and/or any other appropriate value. In some instances, the system may also handle and/or facilitate one or more financial transactions relating to the purchase or booking of that property, and may receive a fee in relation thereto. In some such embodiments, any single property may be booked only once (or a limited number of times) for a certain time period. In such embodiments involving a home sharing market, the conversion window is long, frequency of conversion is low, and seasonality effects both factors. Additionally, the product inventory (of reservable properties) consists of unique products. Accordingly, features such as listing availabilities, market demand and supply are important in a market analysis.

Ideally, advertisers would manage marketing, budgeting, user acquisition, and the like based on determinations of which advertisements are the most valuable in acquiring users. In conventional practices, marketing efforts develop user intent-based budget allocation based on rules developed from the advertiser's own intuition and domain knowledge. For instance, traditionally, a marketer might classify users into buckets, such as active/dormant users, or based on their frequency of logic, and then perform an ad hoc analysis thereon. However, as the factors impacting user acquisition scale in complexity (and as the market becomes increasingly aware of intent-related correlative factors), a rule-based system becomes increasingly more cumbersome to manage and increasingly less optimal. More specifically, as user base and complexity grows, an increasing number of "cuts" or classifications must be made to gain awareness and understanding about the user base, making analysis cumbersome and unfeasible. In addition, in circumstances where the ultimate goal of a marketing effort is to maximize revenue, a solely intent-based system is deficient, as it does not factor in a relevant value analysis. There is therefore a need for a value-based system that combines both travel intent and booking value in order to better understand the customers.

By virtue of the systems and methods described herein, an objective user conversion value can be obtained based on highly user-specific information including actual historic user activity, guiding the application of user acquisition strategies for different markets including home sharing markets. Having user-specific data available allows an advertiser to more efficiently select an advertisement campaign to meet their strategic goals, optimizing for targets such as return on investment of advertising dollars or market penetration with a lower chance of error or inefficacy. The systems described herein are highly personalized to a user visiting the advertiser's site, as the systems take in as a basis for their analysis each visitor's past site activities, account history and/or demographic information. Additionally, the systems can be easily extended to optimize for other metrics simply by changing the target metrics, and using the same trained machine learning models.

FIG. 1 illustrates an environment 100 that includes one or more of user devices (referred to individually or collectively as user devices 150), which may take a variety of forms, each connected to a network 130. Network 130 may comprise one or more network types, such as a wide area network (such as the Internet), a local area network (such as an intranet), a cellular network or another type of wireless network, such as Wi-Fi, Bluetooth, Bluetooth Low Energy, and/or other close-range wireless communications, a wired network, such as fiber optics and Ethernet, or any other such network, or any combination thereof. In some embodiments, the network 130 may be the Internet and payment and information may be communicated between system components in an encrypted format such by a transport layer security (TLS) or secure socket layer (SSL) protocol. In addition, when the network 130 is the Internet, the components of the environment 100 may use the transmission control protocol/Internet protocol (TCP/IP) for communication. A user device 150 may include, among other things, one or more computing devices, such as a smartphone or other hand-held device (e.g., a tablet or reader), desktop computer, laptop computer, touchscreen device, or any other appropriate device capable of receiving, processing, and outputting digital information via network 130. Some user devices 150 may allow a user to transmit and receive data over network 130 via a web browser 110 or one or more applications 120. While FIG. 1 illustrates a one-to-one correspondence between a user device 150 and one of a web browser 110 or app 120, the embodiments are not so limited and any configuration may be possible.

In some embodiments, the user device 150 may initially transmit data to and receive data from one or more web servers 160 or one or more third-party server(s) 180. Data modeling server(s) 170, using data from web server 160 and third-party server 180, may calculate scores corresponding to user intent and/or the value of a property listing, marketing campaign, or the like, allowing for evaluation of marketing plans. In some embodiments, the components and/or functions of data modeling server 170 may be integral with, or executed on, web server 160. In other embodiments, the data modeling server 170 may be implemented discretely from, or redundant with, the web server 160. In some embodiments, the data modeling server 170 and the web server 160 are owned and/or operated by the same entity. In an exemplary embodiment, the data modeling server 170 is connected to the same internal network as the web server 160. Further, while FIG. 1 illustrates only one web server 160, one data modeling server 170, and one third party server 180, it may be understood that any number of such servers may be variously configured in different embodiments, such servers being managed by any number of different entities.

Figure 2:
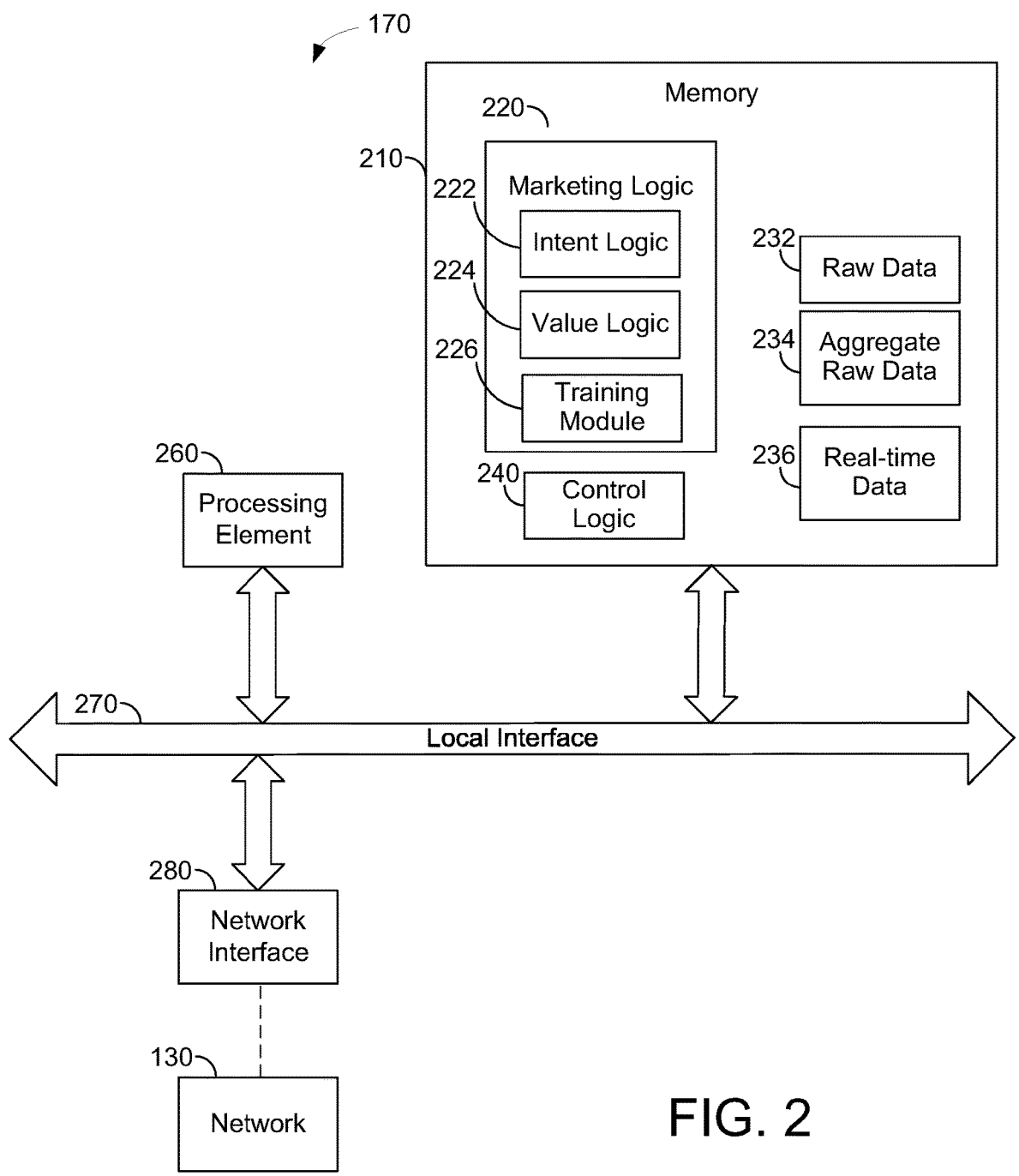
FIG. 2 is a block diagram of certain components of a data modeling server in accordance with some embodiments of the present disclosure.

FIG. 2 depicts an example schematic diagram of certain components of data modeling server 170 in accordance with some embodiments. The data modeling server 170 includes processing elements 260, memory 210, and network interface 280, which components connect through a local interface 270 that can include at least one system bus. The network interface 280 can interface with the network 130. In some embodiments, network interface 280 may use a communication logic (not shown) that includes one or more application programming interfaces (APIs) stored in memory 210 or another storage location, to transmit data over network 130. The processing element 260 may include one or more microprocessors, central processing units (CPU), digital signal processors, graphics processing units, and/or any other specialized processor, combination of processors, or other circuitry that communicates to and drives the other elements via interface 270. In some embodiments, the processing of data modeling server 170 is not limited to being performed by a processing element 260, but instead, any portion of processing in support of the function of the data modeling server 170 may be distributed over one or more computer systems that may be remotely located. In some embodiments, the processor 260 may comprise an artificial neural network or other type of configuration for performing machine learning functions based on instructions stored in memory 210.

Memory 210 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor. Memory 210 may store instructions used in the systems and methods described herein. While FIG. 2 illustrates a single discrete memory 210, the embodiments described herein are not limited to any particular arrangement and other embodiments may store information in one combined memory, or with information stored in a different configuration in one or more memories, some local to the other components illustrated in FIG. 2 and/or some shared with, or geographically located near, other remote computing systems.

As illustrated, memory 210 contains marketing logic 220, which includes an intent logic 222, a value logic 224, and a training module 226. Memory 210 may also contain control logic 240, including one or more algorithms or models for generally controlling the operation of the data modeling server 170. These depicted logics may variously represent one or more algorithms, computational models, decision making rules or instructions, or the like implemented as software code or computer-executable instructions (i.e., routines, programs, objects, components, data structures, etc.) that, when executed by one or more processors 260, program the processor(s) to perform the particular functions of theft respective logic. These logics are depicted in FIG. 2 as several discrete components, each labelled individually, however, in various embodiments, the functions of each respective logic may be executable on their own or as part of one or more other modules; that is, any configuration of the depicted logical components may be used, whether implemented by hardware, software, firmware, or any combination thereof. The capabilities of these various logics are described in greater detail below.

Memory 210 may also contain raw data 232, aggregate raw data 234, and real-time data 236, which respectively include one or more databases storing information used by intent logic 222, value logic 224, and training module 226. It will be noted that while the term "database" or "data storage" may be used herein with reference to elements 210, 232, 234, and 236 and/or the data structures therein, these components are not so limited nor is any particular form, number, or configuration of data storage mandated, and any of the described "databases" may alternatively be an indexed table, a keyed mapping, or any other appropriate data structure or repository.

The data in raw data 232 is pulled from one or more raw archived data sources, that is, collections of raw data are obtained from web server 160. In some embodiments, raw data may also be collected from third-party server(s) 180. These raw data collections in raw data 232 are illustrated as items 311-316 in FIG. 3. In an exemplary embodiment, data is pulled from one or more of web server(s) 160 and third-party server(s) 180 to populate raw data 311-316 on a scheduled basis, e.g., every 24 hours, or any other appropriate frequency. In such embodiments, aggregation and/or analysis of such data (described in greater detail below) may be performed offline, as the data 311-316 remains unchanged during the period between updates/refreshes. In other embodiments, any appropriate schedule may be used or data may be collected in real-time, in response to one or more scheduled events, in cyclical or patterned pull/pushes of data, in alternating, round robin, or variable collection from server(s) 160 and server(s) 180, or by any other configuration. In some embodiments, servers 160, 180 may be queried on a scheduled basis as to whether any data has been updated and a data pull or data dump may be performed only if any update has occurred. In some embodiments, the selected method and frequency of data collection may depend on server computing resources, transmission latency, frequency of activity in the relevant market, a user base size, seasonality or changeability of data, and/or other relevant considerations.

Raw data 232 includes a variety of information collected as users interact with a website or app, make transactions, and the like. Therefore, each of the entries in raw data categories 311-316 can be associated with a particular user or user device, for example, a user ID (if logged in), a device (by device ID, IP address, MAC address, or the like), session ID, other information sufficient to identify a user (such as a unique code or password), or any other appropriate identifying mechanism. By these means, data from raw data 232 can be aggregated per user, for a given period of time, to determine cumulative or summary data for a particular user or set of users that is stored as aggregate raw data 234. While six categories 311-316 of raw data 232 are illustrated, each corresponding to one or more tables (such as hive tables) that can be queried, other embodiments may include any number of categories, and any number of data structures. In an exemplary embodiment, the data between items 311-316 may include some amount of redundancy, as some user actions may be relevant to several categories of data, however in other embodiments, the data is unique to each category 311-316.

Raw data 232 may include landing data 311, that is, an entry point for a user such as a first landing page displayed to a user when accessing a website or app. The displayed landing page may be dependent upon a user or user type (e.g., guest, booker, host, first time/repeat visitor, etc.), location, browser/device type, a link or advertisement followed (directing them to a landing page for a certain listing and/or marketing campaign), a source or referral domain, search engine optimization traffic, or any other appropriate mechanism, such data being collected from URL information, analytics services, internal or external web server logs, and/or other internal or third party systems. Raw data 232 may also include search data 312 tracking each search and/or filter or search refinement operation made by a user by interacting with one or more drop down menus, search fields, radio buttons, maps, sliders, point-and-click interfaces, or other user interface components, by following a link or advertisement corresponding to a saved or forwarded search, or by entering search information into a local or third party search engine. Search data 312 may be pulled from storage in web server 160, obtained from a user's referral information, from a character string in a URL followed by a user, or otherwise obtained from a third party server 180. In some embodiments, web server logs may contain information that allow sites to determine what sites referred the visitor to the present site, what pages a visitor viewed and when, or client IP addresses (which can roughly approximate location). Depending on the structure of the URL of the referring site, additional information can be identified (e.g., where a user's search is included as a character string in a search engine referral addresses). Web server logs can also contain information as to which webpages a user has visited and the order of a user's traversal through a website. Listing views data 313 may include all property (or product) listings viewed by a user, e.g., by clicking on a hyperlink or image to review a webpage or pop-up with additional data, and information relating thereto.

Engagement data 314 may include data regarding how users interact with a website or application. In an exemplary embodiment, this data could include any of click or view data on links, advertisements, images, listings, pages, and so forth, actions such as liking/disliking, bookmarking, saving, marking as favorite, adding or editing wishlists, scrolling, or other actions (or transactions) made by the user. In some embodiments, engagement data 314 may also include cumulative or calculated data based on the user's interaction with the website/app, such as an amount of time spent on a single page, listing, or website (or timestamps from which such time can be later determined), each visitation or view (from which a frequency of visitation or views can be later determined), referrals made, region(s) of searches and/or bookings, minimum, maximum, and median prices of the properties browsed, or any other relevant collected information, however, in other embodiments, this cumulative or summary data is calculated by process 325 and stored as aggregated raw data 234. Additionally, in some embodiments, engagement data 314 may include third-party data such as social media interaction with or regarding the website or app provider, such as shares, tags, comments, referrals, and the like (such third party data being collected from third-party server(s) 180. In other embodiments, such actions or data may be included in a separate category/type of data stored in raw data 232, such as site activity data. In some embodiments, engagement data 314 can be collected from server logs as users visit pages, from server application software which generates the requested pages, and/or by client software such as JavaScript or mobile applications that can detect user actions (e.g., hovering over images, watching videos, and/or tracking the amount of time particular areas of a listing or search results are displayed in the display area, among other things).

User data 315 may include information associated with a user, e.g., user ID, user account information (e.g., name, contact information (e.g., email address, mailing address, telephone number, date of birth, payment card information), a type of user (e.g., guest/registered, business/vacation travelers, etc.), length of membership, booking history, demographic data about the user, such as age, gender, location, language, and device information, GPS, IP address, or location data, operating system, browser, or other device data, user preferences or interests, connected third party accounts (e.g., social networks) if applicable, and the like. Booking data 316 may include bookings and purchase history of users, including dates and prices and where relevant, locations, durations of stay, ratings, and/or reviews. Both user data 315 and booking data 316 may be obtained from server 160, and in some embodiments, part of such data may be obtained from a third-party server 180.

In the illustrated embodiment, all or subsets of raw data 232 can be collected, processed, parsed, analyzed, and/or aggregated in process 325, and the aggregated (and/or otherwise processed data) can be stored as aggregate raw data 234. In one embodiment, the parse/analysis/aggregation in process 325 may involve a standardization or reformatting of data into more easily searchable or accessible data sets, a process most useful in a case that the data in raw data 232 has a variety of disparate formats, sizes, or data types. In some embodiments, the aggregate raw data 234 is aggregated by user (e.g., by user ID, cookie, session ID, location data such as GPS data or check-in data, device ID, MAC addresses, and/or IP addresses), organizing relevant raw data 232 into sets of user-level data. Put another way, aggregation involves the roll-up of individual actions, transactions, observations, or events (raw data) into summary statistics based thereon. In this sense, aggregate raw data 234 may be understood as personalized or individualized features describing a user's activity at a higher level, though in other embodiments, data may by organized by groups or sets of users (for example those sharing similar characteristics or features, such as location or demographic data). Aggregate raw data 234 may also be organized by user for a certain windows of time, e.g., 1 day, 7 days, 14 days, or any set time reflective of available data. In some embodiments, certain data such as a user's account or demographic data may not be time-specific but may be static, as such information is highly unlikely to change (or change significantly) over time, and such information may be included in aggregate raw data 234 even if it is not changed within a recent time period. The time period of such aggregation is limited by the time period of data available in raw data 232.

Aggregate raw data 234 is divided into one or more different tables (or other data structures) at a user-level such as site activity data 322, account data 324, and demographic data 326, each informing user-level behavior about usage of the relevant systems of environment 100. Other configurations are possible in other embodiments. For purposes of illustration, while engagement data 314 of raw data 232 may individually store each action (or some subset of actions) made by a user, such as individual clicks or views of a listing, aggregate raw data 234 may store, as user-level site activity data 322, patterns of data for the user over a period of time, for instance, a ratio of listings viewed by the user in a period of time that remain available, a collection of markets in which the user has search or viewed information, an analysis of saved/liked listings, a computation of a min/max/average of the prices of all the user's viewed listings, and so on.

Figure 3:
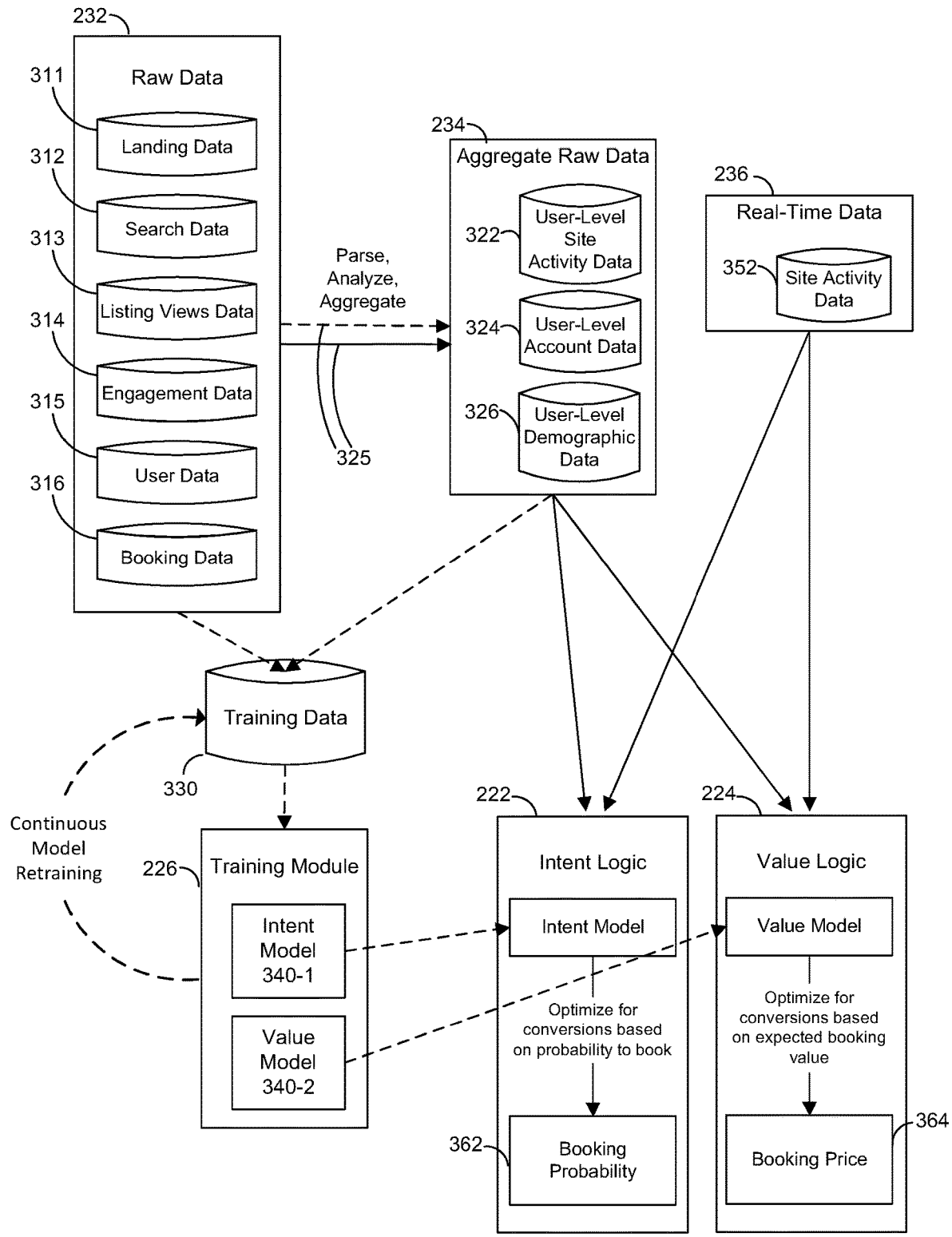
FIG. 3 is a block diagram illustrating an exemplary data flow through a data modeling server in accordance with some embodiments of the present disclosure.

Information from the raw data sources 232 and from the aggregate raw data 234 can be gathered as training data 330, and used by the training module 226 to train data models including intent model 340-1 and value model 340-2. These data models may be later used by intent logic 222 and value logic 224 respectively in their real-time calculations. Training data 330 can be collected from both the raw data 232 and the aggregate raw data 234. The training data 330 takes the form of "features", or signals fed to the models for training and prediction. Training data 330, and the aggregation of data in process 325, is performed on data previously stored as raw data 232, that is, the analysis, transmission, processing, and/or aggregation of data is performed on a static set of data (e.g., data on past actions) as compared to real-time data, and may therefore be performed offline (so as not to require a network connection via network 130). Potential offline processes are indicated in FIG. 3 by dashed line arrows. In other embodiments, such processes may be performed "online" with reliance on a network connection.

Training module 226 is configured to train models that generate one or more predictive analyses based on the data fed thereinto. Retraining may be performed continuously or on a scheduled basis for features. In the case of a home sharing implementation wherein a property listing has an expected conversion period or "conversion window" in which a user may book or convert the property (or purchase the product), training module 226 inputs into models 340-1 and 340-2 features regarding data relevant to that conversion window (as one example, booking data from bookings within a set number of days prior to the day of calculation, the set number of days being equal to the conversion window). Upon retraining, additional features are added or joined to training data 330, to generate new training examples. The most recently added data is used to retraining the models in training module 226 to keep up with seasonality. By retraining the model(s) based on the updated data in training data 330, a model will automatically change to compensate for seasonal or other time-specific market shifts.

Intent model 340-1 calculates a likelihood that a user will book a viewed property, and value model 340-2 calculates an expected amount (e.g., dollar or monetary amount) at which a user will book, assuming that they do book. The trained value models 340-1 and 340-2 are used, by intent logic 222 and value logic 224 respectively, to obtain a user acquisition score representing the return on investment that would be received for marketing to the user.

The value model 340-2 accepts as input a set of features about the user and outputs a prediction of the monetary value (i.e., a base price) of a property booking that a user will make within a certain period of time, referred to herein as a "conversion window" or "conversion time", from the date that the user viewed the listing for the property. The value model 340-2 functions under an assumption that the user will in fact make a booking during that conversion window, that is, that the probability of booking is 1. The prediction performed by the value model 340-2 is based on one or more machine learning algorithms. In one embodiment, the value model uses multiple linear regression to predict user behavior, though in other embodiments, value model 340-2 may tune the signal weights in accordance with another type of supervised regression or classification algorithm. In an exemplary embodiment, in order to calculate the expected booking value of a property, the value model 340-2 may use the following equation:

$$V = V(\text{booking value} \mid \text{booking, person}) = \sum_{0}^{m} w_i * x_i \quad \text{(Equation 1)}$$

where V is the booking value, m is the number of features, $w_i$ is the weight of each feature i, and $x_i$ is the value of feature i. To calculate the value of the feature weights $w_i$, a subset of feature data is obtained regarding users who booked or purchased within the threshold conversion window from the date the user views the list (in some embodiments, a first viewing, and in others, a most recent viewing). In an exemplary embodiment, the calculation is performed as a gradient descent based on the absolute value of the difference between the predicted value and the actual value, the difference being used to adjust the weightings. Training module 226 can sort the features by the absolute value of the weights to identify the most relevant features for each model.

In the exemplary embodiment, value model 340-2 weighs the following features most heavily: destination city and median price of listings viewed by the user within a set window (e.g., 1 day, 7 days, 14 days, etc.). In an exemplary embodiment, the value model determines the most applicable window, based on the aggregated data. As just one example, where highly relevant user activity occurs prior to, e.g., 7 days before the most recent data pull, the value model may use a time window with a greater number of days. Other embodiments may default to a predetermined window of time, e.g., 14 days, to the largest window of time for which data is available, to a relatively small period of time (e.g., 1 day) where historical user or market data suggests a high rate of activity, or to any other appropriate window. The same period of time is applied by the value model in its calculation for different users, thereby allowing like-for-like comparison and aggregation of user data.

In some embodiments, other features relating to the price of listings (e.g., min, max, or average price viewed by the user, prices of listings relevant to the locality of the user's search, prices of the user's historical views or bookings, price changes of listings depending on seasonality, etc.) may also or alternatively be weighted heavily. In one example embodiment, price-related features, including destination city, and other price-related market factors, may be weighted so much more than other features that the effect of other types of features on the output of the value model become negligible, however, other combinations of weights are possible in different embodiments. Of course, the value model 340-2 is not limited to consideration of the features above, and in some embodiments, there is no limit on potentially relevant features. Indeed, such features and the weightings thereof may change based on seasonality, on market, on user type, etc.

Any number of features may be used by the value model, where the weighting of features may differ based on the data generated by the training module 226. That is, in the execution of value model 340-2 by training module 226, the training data 330 is used to determine a set of weights $w_i$ with which probability to book is optimized for the particular user or set of users. Those determined weights $w_i$ are then used in the real-time application of value model 340-2 by value logic 224 to the aggregated and real-time data 234, 236 to generate an actual prediction.

As described above, the value model 340-2 employs a gradient descent based on the absolute value of the difference between the predicted value and the actual value. Gradient descent is an iterative process that works by adjusting the weight(s) of a model looking to minimize error, where the error may be calculated in a variety of ways. In an exemplary embodiment, the value model 340-2 is trained to minimize the absolute value of the difference between the predicted price value and the actual price value. For purposes of example, FIGS. 4A-E illustrate single variable linear regression, where the value model 340-2 attempts to predict the dependent variable, mapped to the y-axis, here the value that the user will pay for the booking, against an independent variable, mapped to the x-axis, here corresponding to a feature from the aggregated raw data. In the illustrated example, the independent variable is a median viewed price (the median price of listings viewed by the user), however, any appropriate feature may be used in different embodiments. The calculation begins with an initial guess as to the value, and based on that guess, an error is calculated by comparing actual results to the predicted results. The error and the input variables are then used to make an adjustment to the weights, and the process repeats until the error reaches a suitable minimum value. The amount of adjustment to the weights can be controlled by momentum and learning rate modifiers. These modifiers may be constant or may vary as the process goes on.

Figure 4A:
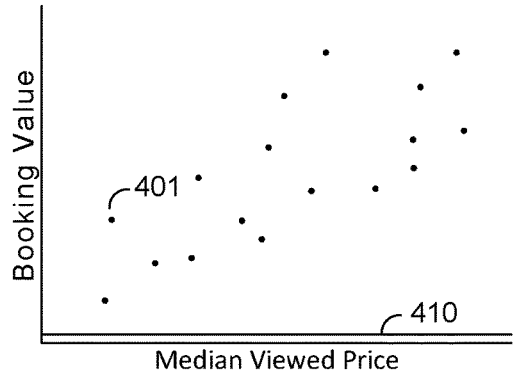
FIG. 4A-4F illustrate gradient descent of an exemplary linear predictive model in accordance with some embodiments of the present disclosure.
Figure 4B:
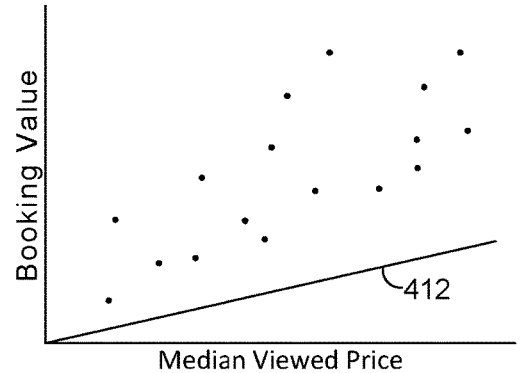
Figure 4C:
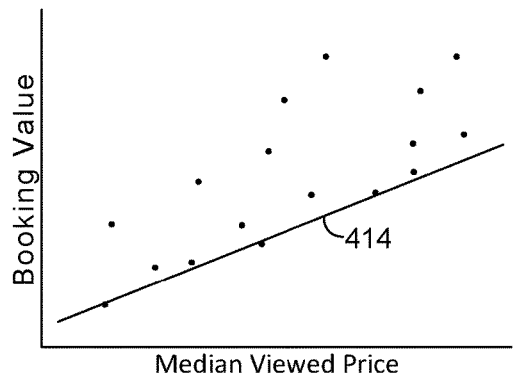
Figure 4D:
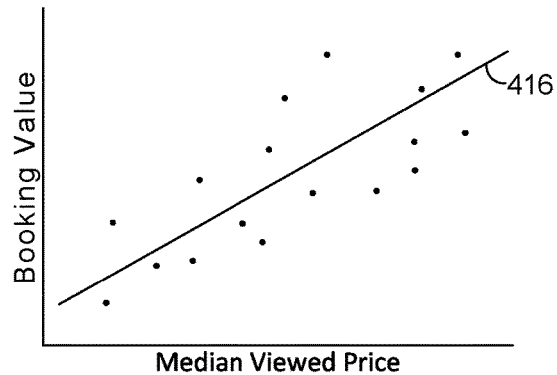
Figure 4E:
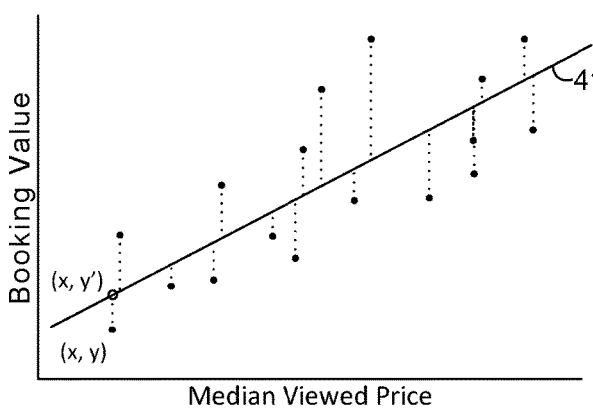
Figure 4F:
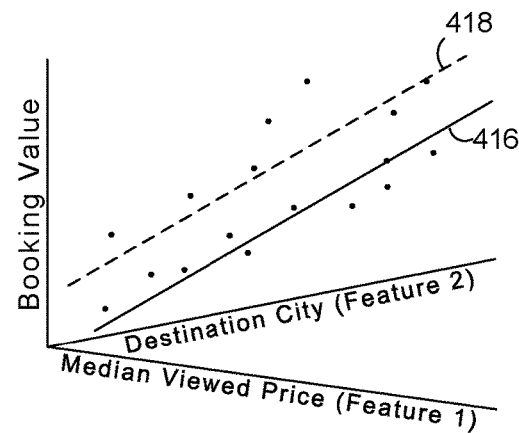

With reference to FIGS. 4A-F, the output of the linear prediction functions are shown as lines 410-418 of a scatterplot. A sample set of training parameters are shown as dots (e.g., dot 401), which maintain the same placement on each of FIGS. 4A-4F. As shown in FIG. 4A, the linear prediction function 410 starts off as an initial guess with a zero sloped line 410. In other embodiments, the initial guess could also be a near vertical line or a line with a slope based on previous training. Training samples are processed through the training algorithm and the collective error is used to make corrections to the slope and intercept of the line, where the resulted linear prediction function changes from line 410 (FIG. 4A) to line 412 (FIB. 4B), then to line 414 (FIG. 4C), and finally to line 416 (FIG. 4D), where the error from the training parameters falls below a minimum value. In some embodiments, the training data may be processed multiple times until a local minimum in the error function is located. FIG. 4E illustrates an exemplary calculation of error by summing the vertical difference (shown as a vertical dotted line) between an actual value for a series of points (the value y of the training parameter with independent variable x, located at the black dots) and the predicted value (the value y' on line 416 corresponding to independent variable x, located at the white circle on line 416).

The same principles apply generally to multiple linear regression, with the exception that the prediction comes in the form of an n−1 dimensional object, where n is the number of variables (viz., features) for the value model 340-2. The embodiment of FIG. 4F uses two independent variables (feature 1 and feature 2) and one prediction function 318, though any number of features may be used in different embodiments. Linear regression is performed for each feature, resulting in functions shown by solid line 416 (feature 1, median viewed price) and dashed line 418 (feature 2, destination city). The relevance of each feature (its correlation with booking value) is calculated through the same process described with reference to FIGS. 4A-4E, and the most features most relevant to value are assigned higher weights than those less relevant to value. Through the assignment of weights to the features in training data 330, the best fitting value model 340-2 can be determined.

In an exemplary embodiment, intent model 340-1 works in a very similar way. The intent model 340-1, when being trained in training module 226, accepts as input a variety of features about the user from training data 330. In one embodiment, the features input into intent model 340-1 are the same as the features input into value model 340-2, though in other embodiments, different sets of features may be used. The intent model 340-1 outputs a predicted probability as to whether the user will book a property (or, in other embodiments, purchase a product) within a certain period of time, i.e., within the "conversion window", from the date that the user viewed the listing for the property. In the exemplary embodiment, intent model 340-1 weighs all or a subset of the following types of features most heavily:

1) User account history (including, e.g., a guest classification into a visitor, user, or booker type, a number of previous bookings, number of days since the visitor created their account, number of day since the user first booked);
2) Past or historical site activity (e.g., a frequency of viewed listings within a set period of time, such as 1, 7, or 14 days);
3) Same-day or recent site activity, obtained from real-time data sources 236 (e.g., whether and how frequently the user logged in, a number of searches, a number of listing views, contacts, and/or bookings, a number of seconds on the site);
4) Listing availability (e.g., a ratio of listings available on the desired reservation date(s) and total viewed listings within a set period of time, such as 1, 7, or 14 days);
5) An origin location of a user (based, e.g., on user-provided locations, GPS, IP address, or location data, operating system, browser, or other device data); and
6) A destination location in which the user has searched.

In some embodiments, other features reflecting, summarizing, or analyzing a frequency of user activity may also or alternatively be weighted heavily. Of course, the intent model 340-1 is not limited to consideration of the features above, and in some embodiments, there is no limit on potentially relevant features. Indeed, such features may change based on seasonality, on market, on user type, etc. In one example embodiment, features types (1)-(6) above may be weighted so much more than other types of features, that the effect of other types of features on the output of the value model become negligible, however, other combinations of weightings are possible in different embodiments. The set period of time used by the intent model 340-1 is, in an exemplary embodiment, determined by the intent model based on the aggregated data. Other embodiments may default to a predetermined window of time, e.g., 14 days, to the largest window of time for which data is available, to a relatively small period of time (e.g., 1 day) where historical user or market data suggests a high rate of activity, or any other appropriate window. The same period of time is applied by the intent model in its calculation for different users, thereby allowing like-for-like comparison and aggregation of users' data.

Figure 5A:
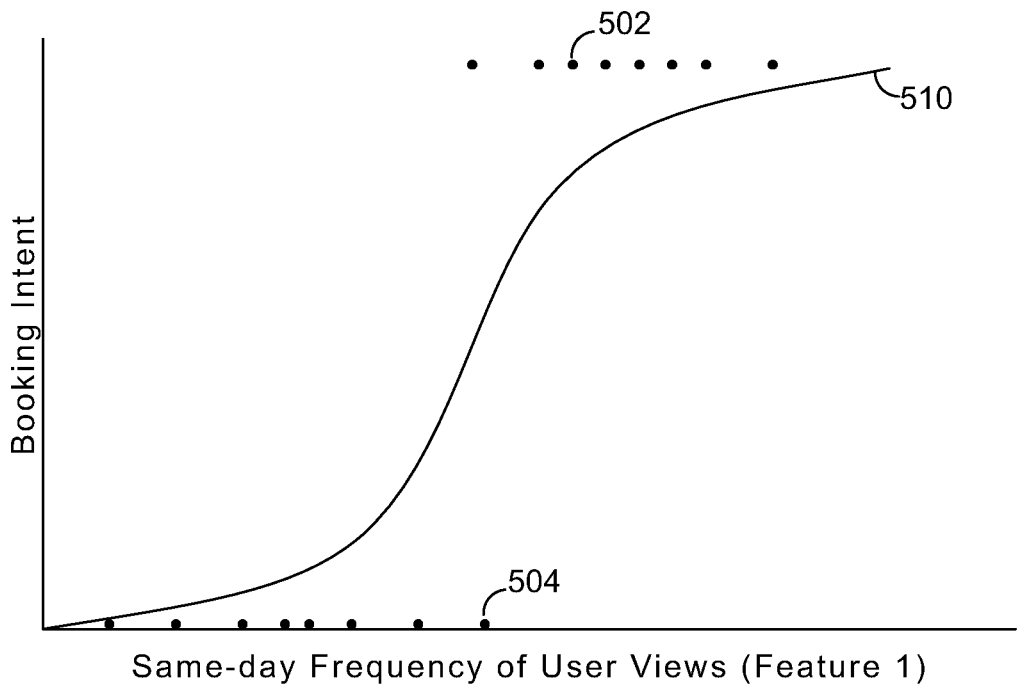
FIGS. 5A and 5B are charts illustrating error calculation of an exemplary linear regression predictive model in accordance with some embodiments of the present disclosure.

The intent model 340-1 uses a methodology similar to that of the value model, but instead of a linear relationship between the independent variable and the predicted variable (as in the value model 340-2), the intent model 340-1 may use a logistic relationship. Exemplary FIG. 5A shows an S-shaped curve 510 such as a sigmoid or arctangent used instead of a linear equation. In an exemplary embodiment, the intent model 340-1 may use the following equation:

$$P = P(\text{booking} \mid \text{person}) = \frac{1}{1 + e^{\sum_{0}^{n} \omega_i * x_i}} \qquad \text{(Equation 2)}$$

Figure 5B:
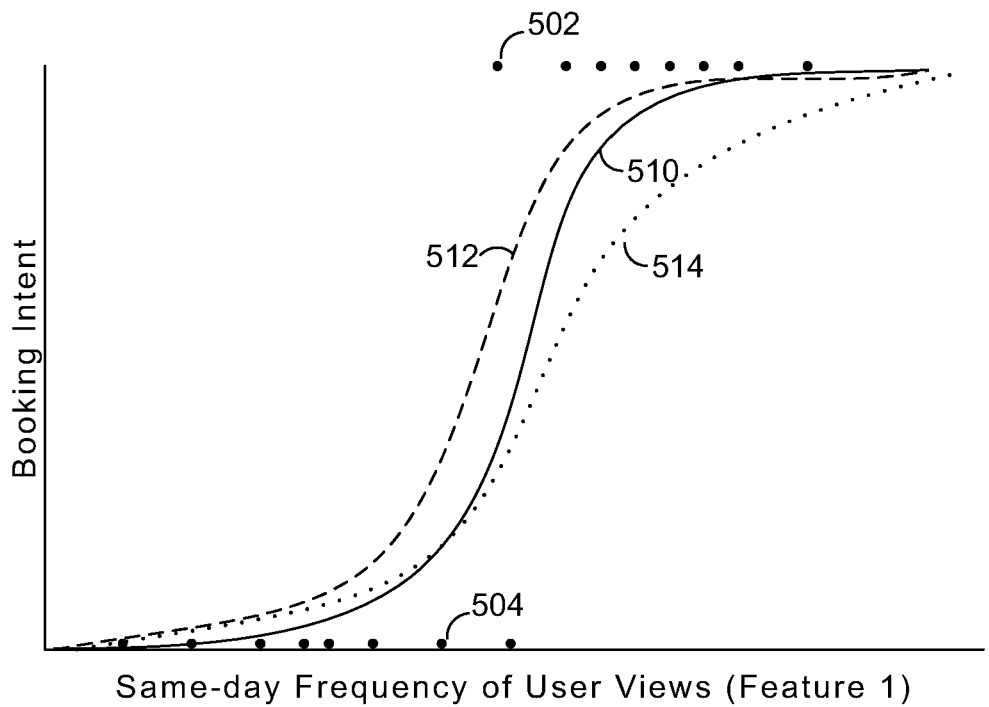

As depicted in FIG. 5B, during the regression process, the logistic prediction function 510 can be adjusted in different ways such as moving it to the left (512) or right (514) or changing the general shape (514) in such a manner so as to reduce the error to a minimum (i.e., to conform the shape of the curve to the actual scattered data points). In an exemplary embodiment, the dependent variable of the intent model 340-1 is a binary value for booking intent, either true or false (e.g., either the user made a booking or they did not, represented by the dots 502 and 504, respectively). For a threshold classification level of the curve (e.g., 0.5), the points below are classified as not likely to book, and points above are classified as likely to book. The classification threshold may be set by computing points of a receiver operating characteristic curve of true/false positive booking predictions (from training data 330), and an area under the curve (AUC) metric can be applied to the receiver operating characteristic (ROC) curve to output a rate of successful classification by the logistic model. The classification threshold maximizing successful classification may thereafter be selected. The output of intent model 340-1 is a probability of any positive value ranging from 0 to 1, where 0 indicates that the user will not book, and 1 indicates that they will definitely book.

In some embodiments, models 340-1 and 340-2 can be specifically trained with fewer features, for example, if an advertiser's advertisement campaigns only allows for the targeting of users along a specific set of features, the value model and/or the intent model can be trained using just those features. In another embodiment, the model can be run using multiple combinations of features and averaging or summing the results relative to other information available. In still other embodiments, different intent models and/or value models may be available for different marketing purposes (e.g., different campaigns, markets, advertising services, etc.) such that the feature sets available for advertisement targeting may match the features available for the predictive models. In some embodiments, for real-time requests including page loads as in the case where the user visits the website and the landing page rearranges and selects items to display as a result of the intent, value, and expected value predictions data modeling server 170 may prioritize speed of calculation. In such embodiments, instead of using all possible features, an optimized list of the most relevant features that can be used by an optimized model can be generated to process real-time requests. The optimized model is trained using the same data set but only used the most relevant subset of features as input. Various feature values are connected by various weights $w_1$-$w_m$ to their respective predictive model.

Through the application of these training techniques, the intent model 340-1 can be applied by intent logic 222 to calculate a likelihood 362 that a user will book a viewed property, and value model 340-2 can be applied by value logic 224 to calculate an expected price 364 (a dollar or monetary amount) at which a user will book, assuming that they do book. The real-time application of intent model 340-1 by intent logic 222 and of value model 340-2 by value logic 224 is performed not on the training data 330 but on a set of information collected from aggregate raw data 234 and real-time data 236. Real-time data 236 may be understood as a collection of data that has accumulated temporally after the last collection of data of raw data 232 from the data sources on servers 160, 180, that is, recent data that could not have been captured in the previous data dump/data pull. In the illustrated embodiment, such recent data includes users' site activity data 352 (the interactions of users with the website or app, collected in real time from web server 160), however in other embodiments, real-time data in any of the same types as data 311-316 may be collected. As the collection (pull or dump) of data in real-time requires a connection to networked data sources (online stream services) over network 130, such data transmission must be done "online." A networked, or "online" process is illustrated in FIG. 3 as a solid line arrow.

In one embodiment, by multiplying the results 362, 364 of the value model and intent model together, data modeling server 170 can obtain a user acquisition score representing the a dollar value return on investment that would be received for marketing to the user that accounts for user intent. The function can be set up where the expected number and features (e.g., demographics, user history, etc.) of the target audience can be entered into the model and the results summed/analyzed to predict the expected reach and expected value (e.g., return on investment) of a particular advertisement campaign. Through the use of standardized feature labels, shared schema, or by following a specified protocol, the models can be used by the advertiser to make determinations, marketing plans, to determine expected penetration or value of the advertisements, to suggest different campaigns, to display content, to help identify target users for an advertisement or promotion, or for other purposes.

Figure 6:
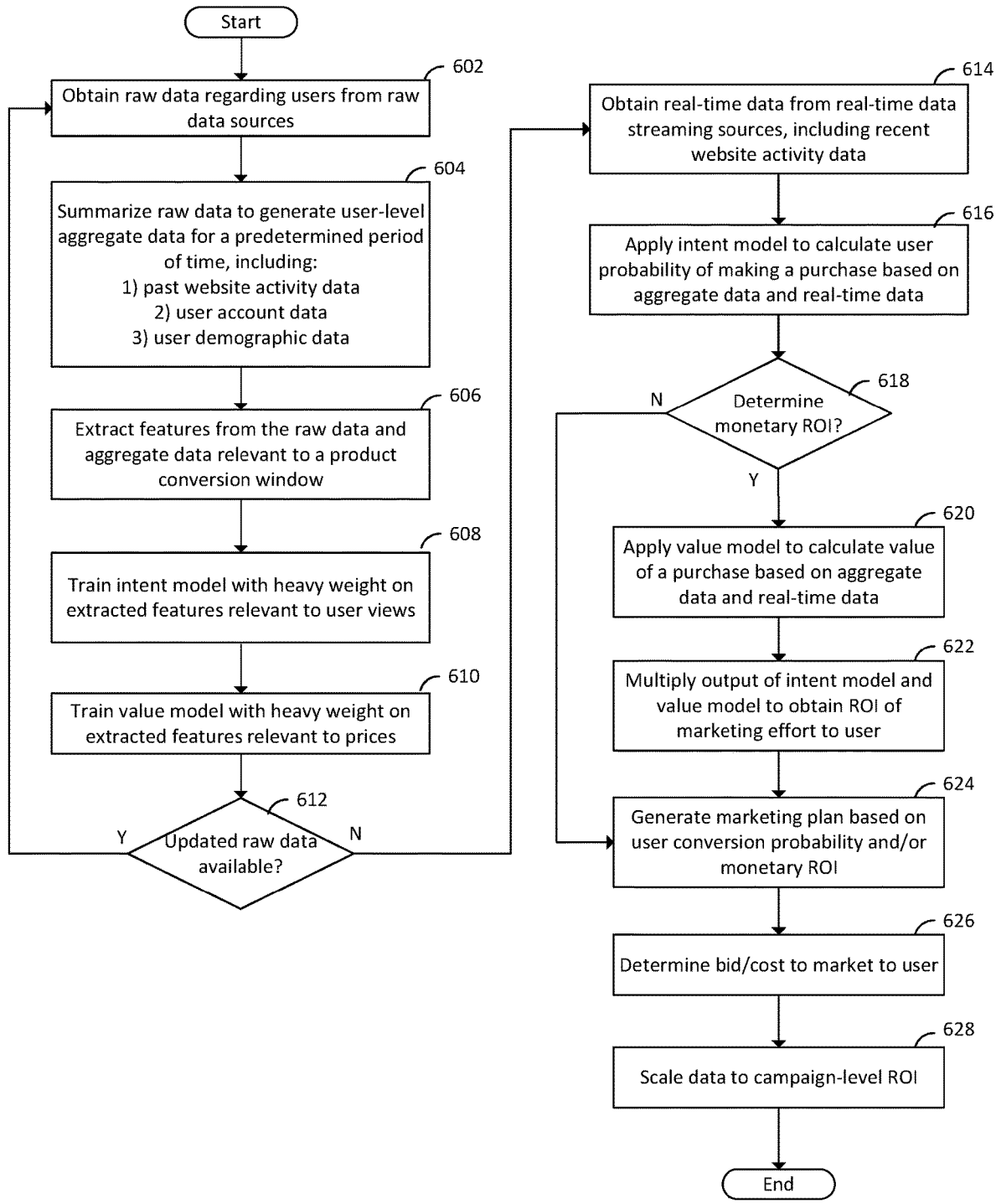
FIG. 6 is a flowchart of an exemplary process to generate a user-level bid/cost value in accordance with some embodiments of the present disclosure.

An exemplary process is illustrated in FIG. 6. The process begins at Step 602, at which raw data regarding user activity is obtained from a variety of networked sources. In some embodiments, the raw data may include any of: user landing data, user search data, user views data, historic/past user engagement or activity data, user account and/or demographic data, and user booking data, though other data (or any subset of this data) may be used in other embodiments. In Step 604, this raw data is summarized or aggregated into user-level aggregate data, specific to a user for a set time period (1 day, 1 week, 1 month, etc.). The aggregate data includes a variety of features, or summary-level statistics, for the user. All features are extracted, in Step 606, for a conversion window, i.e., a window of time (generally a number of days) defining a period between the time that a user has viewed a product or property listing and the time at which the user would be expected to purchase or reserve the product, if the user were going to do so.

A machine learning model to calculate user intent, referred to as an intent model, is trained on the extracted features in Step 608. The intent model assigns a set of weights to the extracted features, with features relevant to frequency of user action (e.g., product/property listings most viewed by the user, latest user logins) being weighted the highest. In some embodiments, other highly-weighted features include one or more of those related to: user account history, user same-day/real-time site behavior, listing/product availability, user origin location, destination of viewed products/listings, and user past/historic site activity/behavior, though other data (or any subset of this data) may be used in other embodiments. Similarly, a machine learning model to calculate expected value of a purchase/booking if one is made, referred to as an value model, is trained on the extracted features in Step 610. The value model assigns a set of weights to the extracted features, with features relevant to price (e.g., destination city/location, and an average/median price of product/property listings viewed by the user within the time window) being weighted the highest. In some embodiments, other highly-weighted features include one or more of those related to: min/max/avg price viewed by the user, price(s) of listings relevant to the locality of the user's search, prices of the user's historical views or bookings, price changes of listings depending on seasonality, etc., though other data (or any subset of this data) may be used in other embodiments.

The intent model and value model are continuously re-trained, such that when there is updated raw data available in Step 612 (occurring, in an exemplary embodiment on a set schedule, such as every 24 hours), the process cycles back to Step 602, with new information from the last update window being added to the training examples, and the respective weightings of the intent model and value model being recalculated in Steps 604-610 in view of the updated information.

As additional user activity may have occurred since the last update of raw data, Step 614 involves obtaining data in real-time from one or more real-time streaming sources. In some embodiments, this data may be user-level real-time data, that is, organized so as to provide user-level statistics, however in other embodiments, the format of the real-time data may be similar to that of the raw data. The real-time data may include, in an exemplary embodiment, all recent user activity on a website, including product/property views, clicks, saved, favorites, etc. In other embodiments, other types of recent information, such as user account data (or other raw data) may be pulled in real-time.

In Step 616, the real-time data and the user-level aggregate data may be entered into the previously-trained intent model. The intent model, applying the set of weightings of the features as calculated in Step 608, calculates a probability that the user will make a purchase (e.g., book a property). In some embodiments where user conversion is prioritized regardless of dollar value of return, no monetary return on investment (ROI) may be necessary (NO in Step 618), and the user probability of booking determined by the intent model may be sufficient to generate a marketing plan, as in Step 624. In such embodiments, the generated marketing plan may be used in Step 626 to determine a value (e.g., dollar or resource value) to invest in marketing to the user, such as an advertising bid, a maximum marketing cost, or the like. In embodiments where a monetary ROI (the expected value from the user) is the target calculation (YES in Step 618), the process continues to Step 620, in which the value model is applied using the set of weightings of the features as calculated in Step 610. The value model outputs an expected value under an assumption that the user will definitely make a purchase/booking. This value may be multiplied with the intent to book calculated by the intent model, in Step 622, to determine the ROI for the user, factoring in both the user intent and the booking value.

By these means, a highly personalized ROI determination can be made for a user that maximizes revenue, uses each visitor's past site activities, account history, and demographic information. This determination is used, in Step 624 to generate a related marketing plan, and in Step 626 to determine a marketing investment (e.g., an advertising bid) for the user. In Step 628, these determinations can be scaled over multiple users to campaign-level statistics that take into consideration customer-specific data, so as to obtain information including the potential conversion rates and expected values of potential sales generated by various potential advertisement campaigns. In order to perform the scaling of Step 628, the ROI of each of a set of users (Steps 602-624) is evaluated, the set of users sharing, for example, one or more common features such as geographic origin location of the user, geographic location of the market, price range of viewed listings, etc. As one example, if a marketing campaign is to be launched in a particular location, such as San Francisco, Calif., the processes of FIG. 6 may be applied to see, in aggregate, the likelihood of conversion and/or the monetary return on investment, of every user located in San Francisco, allowing campaign-level decisions to be made.

In one embodiment, the calculation performed by one or both of the intent model and the value model can be used to determine an expected market penetration and/or evaluate return on investments of proposed advertisement campaigns. For instance, an output of the intent model and/or the value model may be used to determine whether a user is eligible for a discount or coupon, and/or the frequency or value of such discount. In another embodiment, the calculation performed by one or both of the intent model and the value model can be used to select marketing targets or advertisements to display or deliver to potential customers. For instance, the content and quality of an advertisement may be calculated in correlation with a calculated intent score, e.g., higher quality of advertisements or greater total spend may be focused on consumers with lower calculated intent, under the assumption that high-intent consumers do not need additional invested resources to be induced to convert.

In still another embodiment, the calculation performed by one or both of the intent model and the value model can be used to select information to be presented on web-based user landing pages including what content to display and how to order or arrange various elements (in some embodiments, property listings, image or text content, recommendations, etc.). As one such example, where the intent model indicates a consumer with a high-intent to book a property listing, the consumer can be directed to a landing page showing other listings with similar features, while, a consumer with a lower calculated intent score may be directed to a landing page with more exploratory results, relating to a point of interest, etc. Of course, other applications may be possible in other embodiments.

In one embodiment relating to targeting marketing activity, one or more of the intent model and the value model exclude from their estimations data relating to users with comparatively low intent to purchase and/or comparatively high intent to purchase (e.g., the lowest and highest 25%, or any appropriate percentage or number of users), under the assumption that targeted marketing is unlikely to alter the intent of such users. This exclusion may result in higher incrementality (a higher lift in conversion).

The systems and methods described herein are not limited to markets relating to property rental/booking, but can be used for a variety of markets or a variety of purposes in the home rental market. For instance, by changing the target variables from those related to property-specific characteristics such as, e.g., destination city, the described systems can be extended to optimize for other metrics. In one embodiment, the data modeling server can be used to determine metrics related to mobile app install, and the intent model and/or value model may be used to use to determine a likelihood a user will install an app and/or the price they would pay to do so, respectively. In other embodiments, metrics related to user sign ups, consumer lifetime value calculations, and the like can be determined.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

The following is claimed:

1. A method for determining a predicted value of a user purchase for booking a property via a computer system, the method comprising:
    monitoring activity of the user in searching for property listings on the computer system;
    storing a first plurality of user metrics in a raw data format, the first plurality of user metrics relating to the activity of the user on the computer system and property-specific characteristics of properties described by the property listings searched by the user;
    storing a second plurality of user metrics associated with the activity of the user on the computer system within a window of time, the second plurality of user metrics being generated by aggregation of data in the first plurality of user metrics;
    grouping the second plurality of user metrics into one or more features, each feature corresponding to a statistic of the data in the second plurality of user metrics;
    training a first machine learning model, using a first regression-based algorithm, based on a first set of feature-specific weighting that distinguishes between the one or more features, the first machine learning model for predicting probabilities of purchases by the user;
    training a second machine learning model, using a second regression-based algorithm, based on a second set of feature-specific weighting that distinguishes between the one or more features, the second machine learning model for predicting values of purchases by the user;
    applying, by at least one processor, the first machine learning model to the second plurality of user metrics for generating a predicted probability of the user purchase for booking the property;
applying, by the at least one processor, the second machine learning model to the second plurality of use metrics for generating a predicted value of the user purchase for booking the property;
combining, by the at least one processor, the predicted probability of the user purchase generated by the first machine learning model and the predicted value of the user purchase generated by the second machine learning model as a weight summation to generate a predicted return on investment (ROI) value; and
selecting with the at least one processor a landing page for presentation to the user based on the predicted ROI value,
wherein the first machine learning model and the second machine learning model are retrained continuously or on a scheduled basis for features from a prior conversion period to compensate for seasonal or time-specific market variations.

2. The method of claim 1, wherein the training of the first machine learning model comprises identifying features, of the one or more features, relevant to the user's past activity on the computer system, and
wherein the training of the second machine learning model comprises identifying features, of the one or more features, relevant to the price of the user purchase.

3. The method of claim 1, wherein the training of the first machine learning model comprises identifying features, of the one or more features, relevant to a frequency of the user's activity on the computer system.

4. The method of claim 1, wherein generating the predicted ROI value further comprises:
determining, based on (a) the second plurality of user metrics and (b) the second machine learning model, the expected value of a purchase if made by the user; and
calculating the predicted ROI value by multiplying the expected value of the purchase by the predicted probability of the user purchase.

5. The method of claim 1, wherein the first regression-based algorithm is a logistic regression model, and the second regression-based algorithm is a linear regression model.

6. The method of claim 1, wherein the first set of feature-specific weightings weighs features corresponding to one or more of the following items more heavily than at least one other feature of the one or more features:
a) user account history, b) past or historical user activity, c) recent user activity, d) availability of a set of property listings viewed by the user, e) location of the user, and f) location of the set of property listings viewed by the user.

7. The method of claim 1, wherein the second set of feature-specific weightings weighs features corresponding to one or more of the following items more heavily than at least one other feature of the one or more features: a) location of a set of property listings viewed by the user, and b) a median price of the set of property listings viewed by the user.

8. A system for obtaining a real-time computative prediction of a return on investment (ROI) value for a user based on user data provided by one or more servers over a network, the system comprising:
a web server;
a memory configured to store a plurality of user data in a raw data format, the plurality of user data relating to activity of the user in searching for property listings on the system, the plurality of user data being obtained from the web server and indicating property-specific characteristics of properties described by the property listings; and at least one processor configured to:
transform the plurality of user data into a set of aggregated user metrics associated with the activity of the user on the system within a window of time;
store the aggregated user metrics in the memory;
categorize the aggregated user metrics into one or more training signals;
generate a first set of weighted multipliers for the one or more training signals using a first regression-based algorithm;
train a first machine learning model based on the first set of weighted multipliers, the first machine learning model for predicting probabilities of purchases by the user;
generate a second set of weighted multipliers for the one or more training signals using a second regression-based algorithm;
train a second machine learning model based on the second set of weighted multipliers, the second machine learning model for predicting values of purchases by the user;
apply the first machine learning model to the aggregated user metrics to calculate a predicted probability that the user will make a purchase for booking a property;
apply the second machine learning model to the aggregated user metrics to calculate a predicted value of the purchase for booking the property;
generate the prediction of the ROI value for the user based on the predicted probability that the user will make the purchase and the predicted value of the purchase, wherein the predicted probability is calculated by applying the first learning model and the predicted value is calculated by applying the second machine learning model; and
select a landing page for presentation to the user based on the prediction of the ROI value,
wherein the first machine learning model and the second machine learning model are retrained continuously or on a scheduled basis for features from a prior conversion period to compensate for seasonal or time-specific market variations.

9. The system of claim 8, wherein the at least one processor is further configured to:
obtain real-time data relating to the user's activity on the system; and
store the real-time data in the memory,
wherein the first machine learning model is applied to (a) the aggregated user metrics and (b) the real-time data to calculate the predicted probability, and
wherein the second machine learning model is applied to (a) the aggregated user metrics and (b) the real-time data to calculate the predicted value.

10. The system of claim 8, wherein generating the first set of weighted multipliers comprises identifying training signals relevant to the user's past activity on the system.

11. The system of claim 8, wherein generating the first set of weighted multipliers comprises identifying training signals relevant to a frequency of the user's activity on the system.

12. The system of claim 8, wherein generating the second set of weighted multipliers comprises identifying training signals relevant to a purchase price of the purchase.

13. The system of claim 8, wherein the first regression-based algorithm is a logistic regression model, and the second regression-based algorithm is a linear regression model.

14. The system of claim 8, wherein the first set of weighted multipliers weighs training signals corresponding to one or more of the following items more heavily than at least one other training signals of the one or more training signals: a) user account history, b) past or historical user activity, c) recent user activity, d) availability of a set of property listings viewed by the user, e) location of the user, and f) location of the set of property listings viewed by the user.

15. The system of claim 8, wherein the second set of weighted multipliers weighs training signals corresponding to one or more of the following items more heavily than at least one other training signal of the one or more training signals: a) location of a set of property listings viewed by the user, and b) median price of the set of property listings viewed by the user.

16. The method of claim 1, further comprising receiving with at least one processor real-time data indicative of activity of the user on a website, wherein the applying the first machine learning model comprises applying the first machine learning model to at least a first portion of the real time data for generating the predicted probability of the user purchase, and wherein the applying the second machine learning model comprises applying the machine learning model to at least a second portion of the real-time data for generating the predicted value of the user purchase.

* * * * *

UNITED STATES PATENT AND TRADEMARK OFFICE
CERTIFICATE OF CORRECTION

PATENT NO. : 11,625,796 B1  
APPLICATION NO. : 16/653722  
DATED : April 11, 2023  
INVENTOR(S) : Xingnan Xia, Xi Chen and Shike Mei Page 1 of 1

It is certified that error appears in the above-identified patent and that said Letters Patent is hereby corrected as shown below:

On the Title Page

Item (72):  
"(72) Inventors: Xingnan Xia, San Francisco, CA (US);  
               Shawn Chen, Milbrae, CA (US);  
               Shike Mei, San Carlos, CA (US)"

Should read:  
--(72) Inventors: Xingnan Xia, San Francisco, CA (US);  
               Xi Chen, Milbrae, CA (US);  
               Shike Mei, San Carlos, CA (US)--

Signed and Sealed this  
Fourth Day of November, 2025

John A. Squires  
*Director of the United States Patent and Trademark Office*